US012084318B2

(12) United States Patent
Hardin

(10) Patent No.: US 12,084,318 B2
(45) Date of Patent: Sep. 10, 2024

(54) BUILDING CONTAINER OUTRIGGER AND METHODS OF USE

(71) Applicant: Michael Hardin, Buford, GA (US)

(72) Inventor: Michael Hardin, Buford, GA (US)

( * ) Notice: Subject to any disclaimer, the term of this patent is extended or adjusted under 35 U.S.C. 154(b) by 350 days.

(21) Appl. No.: 17/708,553

(22) Filed: Mar. 30, 2022

(65) Prior Publication Data

US 2022/0228389 A1 Jul. 21, 2022

Related U.S. Application Data

(63) Continuation-in-part of application No. 17/216,329, filed on Mar. 29, 2021, now Pat. No. 11,401,107, and a continuation-in-part of application No. 17/216,358, filed on Mar. 29, 2021, now Pat. No. 11,390,498, and a continuation of application No. 17/197,360, filed on Mar. 10, 2021, now Pat. No. 11,359,395.

(60) Provisional application No. 63/002,113, filed on Mar. 30, 2020.

(51) Int. Cl.

| | |
|---|---|
| ***B66C 23/20*** | (2006.01) |
| ***E04B 1/348*** | (2006.01) |
| ***E04G 3/28*** | (2006.01) |
| ***E04G 21/14*** | (2006.01) |
| ***E04H 1/12*** | (2006.01) |

(52) U.S. Cl.

CPC .......... *B66C 23/203* (2013.01); *E04B 1/3483* (2013.01); *E04G 3/28* (2013.01); *E04G 21/142* (2013.01); *E04H 1/1205* (2013.01)

(58) Field of Classification Search

CPC ....... B66C 23/203; B66C 17/06; B66C 19/00; B66C 23/201; B66C 23/202; E04G 3/28; E04G 21/166; E04G 21/142; E04B 1/3483; E04H 1/1205

USPC .......................................................... 182/82

See application file for complete search history.

(56) References Cited

U.S. PATENT DOCUMENTS 2,288,354 A * 6/1942 Hill ...................... B66C 23/202 294/85
3,827,744 A 8/1974 Ferdelman et al.

(Continued)

OTHER PUBLICATIONS

International Search Report and Written Opinion dated Aug. 11, 2021 for corresponding International Application No. PCT/US2021/024757.

(Continued)

*Primary Examiner* — Brian E Glessner
*Assistant Examiner* — Adam G Barlow
(74) *Attorney, Agent, or Firm* — Mathew L. Grell, Esq.; Grell & Watson Patent Attorneys LLC

(57) ABSTRACT

A building container outrigger to provide an elevated work space for use between concrete slabs of a building under construction having a container, a plurality of support beams, each support beam positioned lengthwise under the floor of the container and extend therefrom the sides, a pair of spaced apart outrigger beams, a first outrigger end and a second outrigger end, each second outrigger end in contact with and affixed to the upper side of each support beam end, the other outrigger beam end removeably anchored to the slab floor with the front edge of the container flush with the exterior or front slab edge, and, thus, functions to functions to efficiently move materials and tools or personnel space from floor to floor as construction phases move vertically.

9 Claims, 14 Drawing Sheets

(56) References Cited

U.S. PATENT DOCUMENTS

| | | | | | |
|---|---|---|---|---|---|
| 3,910,379 | A * | 10/1975 | Miller | B66C 23/18 | 182/128 |
| 4,444,289 | A * | 4/1984 | Jungman | E04G 21/166 | 52/749.1 |
| 5,426,907 | A * | 6/1995 | Franklin | B66C 23/32 | 212/253 |
| 5,630,482 | A * | 5/1997 | Schw orer | E04G 11/28 | 425/65 |
| 6,575,685 | B2 * | 6/2003 | Baxter, Sr. | E04G 21/166 | 414/609 |
| 7,070,020 | B2 * | 7/2006 | Preston | E04G 3/28 | 182/82 |
| 8,584,801 | B2 * | 11/2013 | Baxter | B66C 23/205 | 182/141 |
| 9,528,285 | B2 * | 12/2016 | Blinn | E04G 21/3266 | |
| 9,765,536 | B2 * | 9/2017 | McKeon | E04G 3/28 | |
| 10,167,063 | B2 * | 1/2019 | Lin | B66F 7/02 | |
| 10,703,591 | B2 * | 7/2020 | Preston | B65G 69/22 | |
| 10,934,727 | B2 * | 3/2021 | Snell | B66C 23/26 | |
| 2003/0029825 | A1 * | 2/2003 | Baxter Sr. | B66C 23/201 | 212/179 |
| 2003/0079940 | A1 * | 5/2003 | Preston | E04G 21/166 | 182/223 |
| 2009/0020362 | A1 * | 1/2009 | Diaz | E04G 21/16 | 182/113 |
| 2011/0214824 | A1 * | 9/2011 | Beristain | E04G 21/166 | 160/368.1 |
| 2015/0152656 | A1 * | 6/2015 | Mckeon | E04G 3/28 | 414/800 |
| 2018/0305940 | A1 | 10/2018 | Liggins | | |
| 2021/0323795 | A1 * | 10/2021 | Waisanen | B66C 1/10 | |

OTHER PUBLICATIONS

Non-Final Office Action issued on Dec. 20, 2021 in corresponding U.S. Appl. No. 17/197,360.

Non-Final Office Action issued on Dec. 21, 2021 in corresponding U.S. Appl. No. 17/216,329.

Non-Final Office Action issued on Nov. 29, 2021 in corresponding U.S. Appl. No. 17/216,358.

* cited by examiner

BUILDING CONTAINER OUTRIGGER AND METHODS OF USE

CROSS-REFERENCE TO RELATED APPLICATIONS

To the full extent permitted by law, the present U.S. Non-provisional patent application is a continuation application of U.S. patent application Ser. No. 17/197,360, filed on Mar. 10, 2021, entitled "Building Container Outrigger and Methods of Use", is a continuation-in-part application of U.S. patent application Ser. No. 17/216,329, filed on Mar. 29, 2021, entitled "Building Trash Container Outrigger and Methods of Use, is a continuation-in-part application of U.S. patent application Ser. No. 17/216,358, filed on Mar. 29, 2021, entitled "Building Crane Outrigger and Methods of Use and, which claims priority to U.S. Provisional Application No. 63/002,113, filed on Mar. 30, 2020, entitled "Building Construction Container Outrigger and Methods of Use", which is incorporated by reference herein in its entirety.

FIELD OF THE DISCLOSURE

The present disclosure is directed to building construction. More specifically, the present disclosure is directed to a mobile container to move from floor to floor as construction phases move vertically with the build.

BACKGROUND

Currently high-rise building construction are constructed of steel and reinforced concrete used as residential, office building, or other functions including hotel, retail, or with multiple purposes combined. Construction of high-rise buildings requires moving materials, workers, and tools from floor to floor as construction phases move vertically with the build. One approach to moving materials and tools from the base of the build to floor to floor as construction phases move vertically is a tower crane used to lift materials and tools. One disadvantage to tower crane is the expense to move individual loads of materials and tools from the base of the build to floor to floor as construction phases move vertically. Another approach to moving workers, materials, and tools from the base of the build to floor to floor as construction phases move vertically is an exterior elevator used to lift workers, materials, and tools. One disadvantage to exterior elevator is the foot print and weight restrictions limit the amount of materials and tools that can be moved from the base of the build to floor to floor as construction phases move vertically. Moreover, workers carry their tools of trade daily to and from the floor where their trade is at work for the day congesting the exterior elevator to worker movements almost exclusively. Still furthermore, when a worker forgets a tool or material in their truck or needs a break the worker must vertically traverse the exterior elevator adding cost and time to the building construction project.

Therefore, it is readily apparent that there is a recognizable unmet need for a building container outrigger and methods of use that may be configured to address at least some aspects of the problems discussed above common to moving workers, materials, and tools from the base of the build to floor to floor as construction phases move vertically.

SUMMARY

Briefly described, in an example embodiment, the present disclosure may overcome the above-mentioned disadvantages and may meet the recognized need for a building container outrigger and methods of use to provide an elevated work space for use between concrete slabs, the concrete slab having a floor and an exterior or front slab edge of a high-rise building having a container having a front edge, sides and a floor, a plurality of support beams having an upper side and support ends, each support beam positioned lengthwise under the floor of the container and extend therefrom the sides to support the container, a pair of spaced apart outrigger beams having an underside, a first outrigger end and a second outrigger end, each underside side of each second outrigger end in contact with and affixed to the upper side of each support beam end, the underside of the a first outrigger end removeably anchored to the slab floor with the front edge of the container flush with the exterior or front slab edge and, thus, functions to efficiently move materials and tools from floor to floor as construction phases move vertically with the build and move break rooms, bathrooms, offices, meals, and the like from floor to floor as construction phases move vertically with the build.

Accordingly, in one aspect, the present disclosure saves time, money, and enables materials and personnel to complete work tasks on a designated floor of a high-rise building under construction or retrofit without having to ride an elevator up and down the building for tools, materials, breaks, bathroom, management discussions, meals, and the like.

Accordingly, in another aspect, the present disclosure saves time, money, and enables job specific pre-configured container with tools and material to be configured off site for a specific build and delivered to the build site when needed and elevated to a designated floor of a high-rise building under construction or retrofit to meet workers ready for the specific build. Moreover, if the specific build is longer than the workday remaining materials and tools may be secured in the container proximate designated floor for future uses saving time and money at the end of the day returning tools and materials to the base of the build.

Accordingly, in another aspect, the present disclosure saves time, money, and enables pre-configured containers for breaks, bathroom, management discussions, meals, and the like to be located proximate workers and supervisors saving time and money to transit personnel to trailers previously positioned on the ground.

Accordingly, in another aspect, the present disclosure saves time, money, and enables pre-configured containers to be anchored to elevated floor slab exterior edge saving ground space at the base of the build needed for equipment, storage, shipping and receiving, parking, and local traffic.

In an exemplary embodiment of a building container outrigger system may include a container having sides, a front edge, and a floor, a pair of outrigger beams having an upper outrigger side and a lower outrigger side, each the outrigger beam positioned proximate one of the sides of the container, and a plurality of support beams having ends, an upper support side, and lower support side, each the support beam positioned under the floor of the container, the lower support side ends of the support beam removeably affixed to the lower outrigger side of each the outrigger beam.

In another exemplary embodiment of a method of equipping slabs of a high-rise building for a construction task, including the steps of providing an outrigger work space having a container having sides, a front edge, and a floor, a pair of outrigger beams having an upper outrigger side and a lower outrigger side, each the outrigger beam positioned proximate one of the sides of the container, and a plurality of support beams having ends, an upper support side, and lower support side, each the support beam positioned under the floor of the container, the lower support side ends of the support beam, selecting furnishings to complete the construction task, loading the container with the materials and tools, transporting the container to the building, lifting the container to a position between slabs of the building, positioning an extended end of the outrigger beam therebetween the slabs of the building, securing the extended end of the outrigger beam therebetween the floor slabs/concrete slabs of a high-rise building, and accessing the container from the slab of the building.

A feature of the present disclosure may include a variety of container job configurations, such as pre-equipped for a scheduled build with tools and materials for current build for a designated floor of a high-rise building under construction or retrofit task, including but not limited to rough in of walls, electrical, plumbing, insulation, HVAC, drywall, windows, trim, flooring, paint, furnishings, which may be ordered, fulfilled and shipped as a container service to the build site furnished with tools and materials needed to complete such task.

A feature of the present disclosure may include a variety of possible container interior configurations such as for use as office, break, lunch, bathroom, storage, management discussions, meals, and the like to be located proximate workers.

A feature of the present disclosure may include a variety of attachment or mechanical connections systems between parts and elements.

A feature of the present disclosure may include beams, channels, angle, tubes or like supports constructed to connect container to concrete slab floor and an exterior or front slab edge.

These and other features of the building container outrigger and methods of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present a building container outrigger and methods of use will be better understood by reading the Detailed Description of the Preferred and Selected Alternate Embodiments with reference to the accompanying drawing Figures, in which like reference numerals denote similar structure and refer to like elements throughout, and in which.

Figure 1:
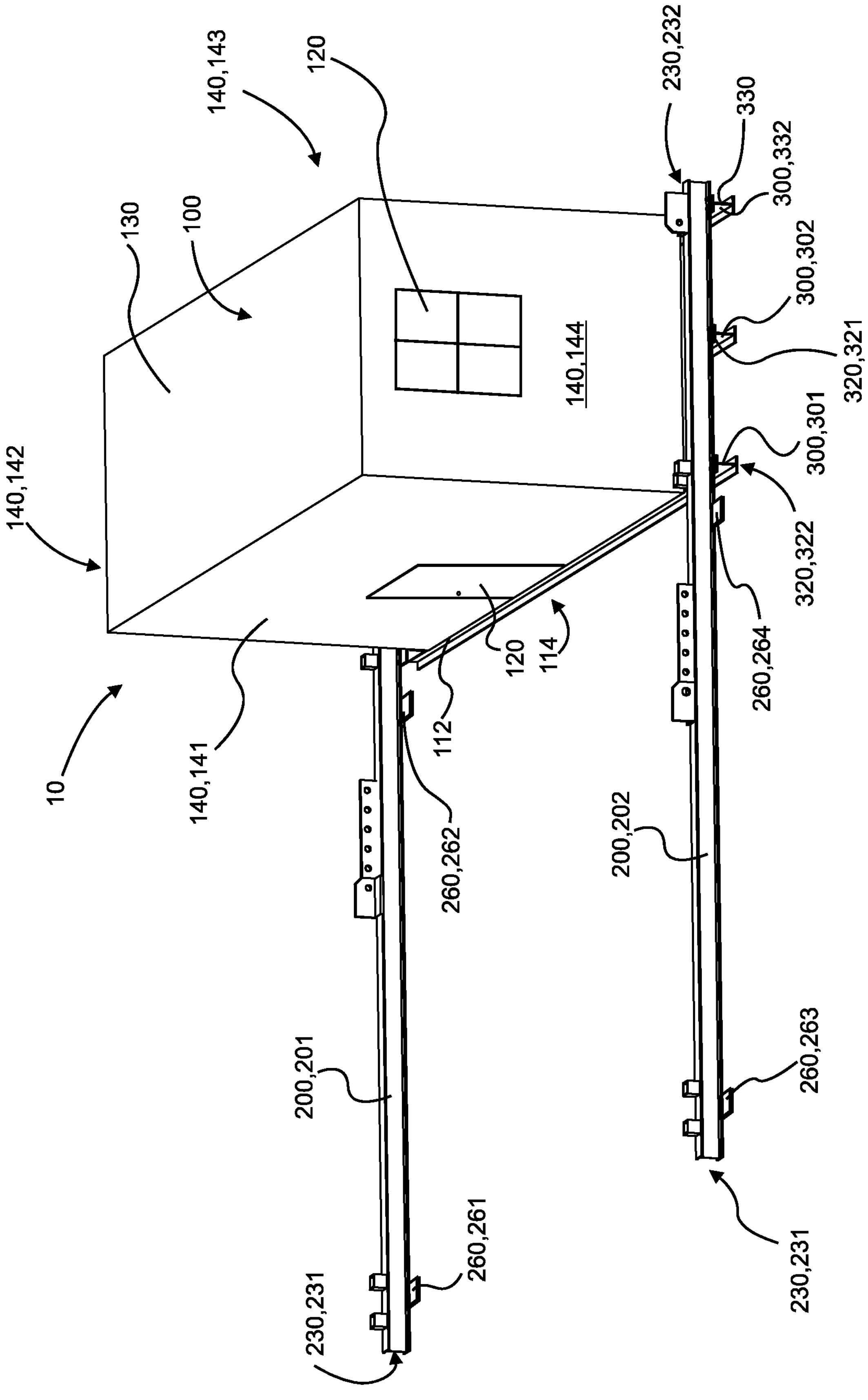
FIG. 1 is a perspective view of an exemplary embodiment of the building container outrigger according to select embodiments of the instant disclosure.
Figure 2:
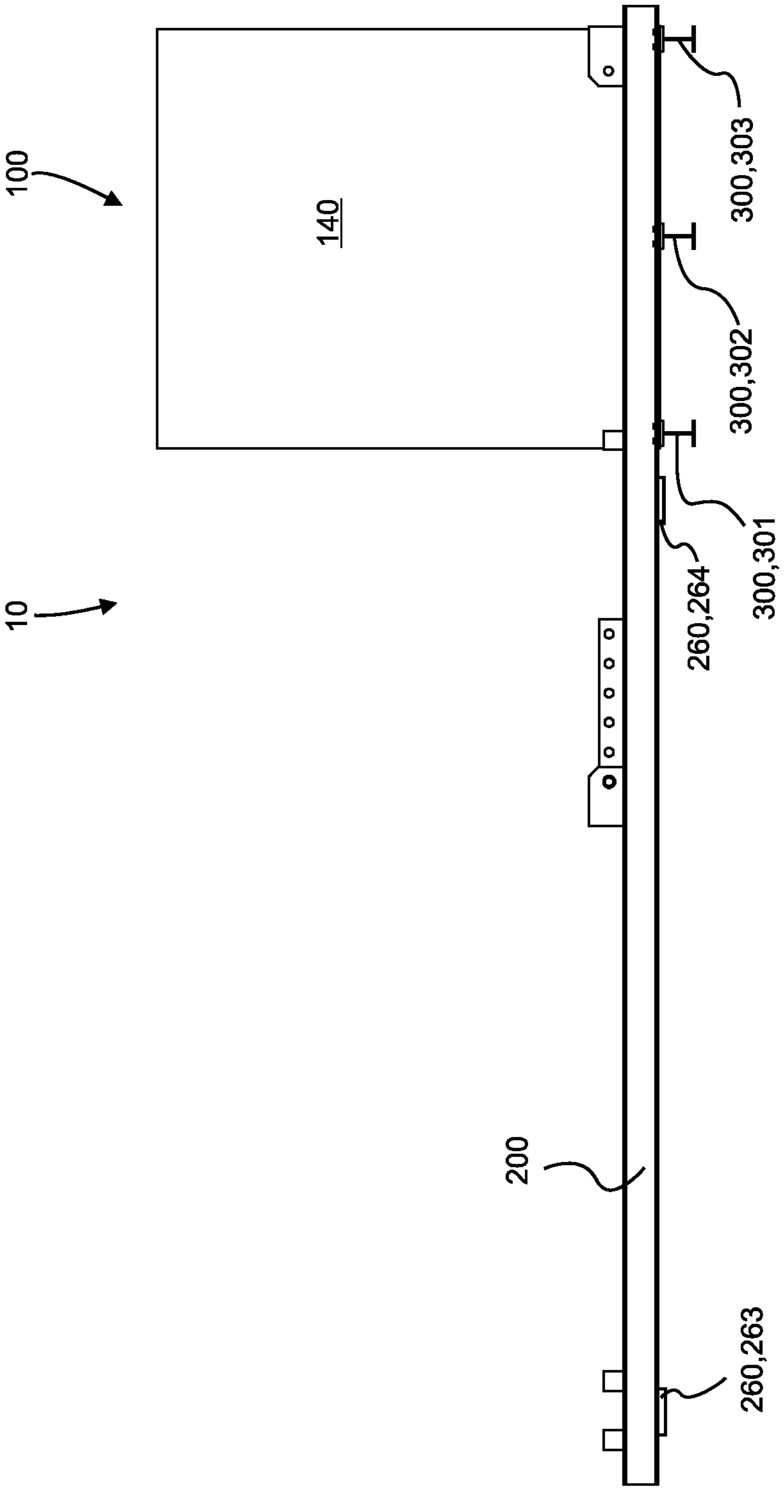
FIG. 2 is a side view of an exemplary embodiment of the building container outrigger according to select embodiments of the instant disclosure.
Figures 3, 3A, 3B:
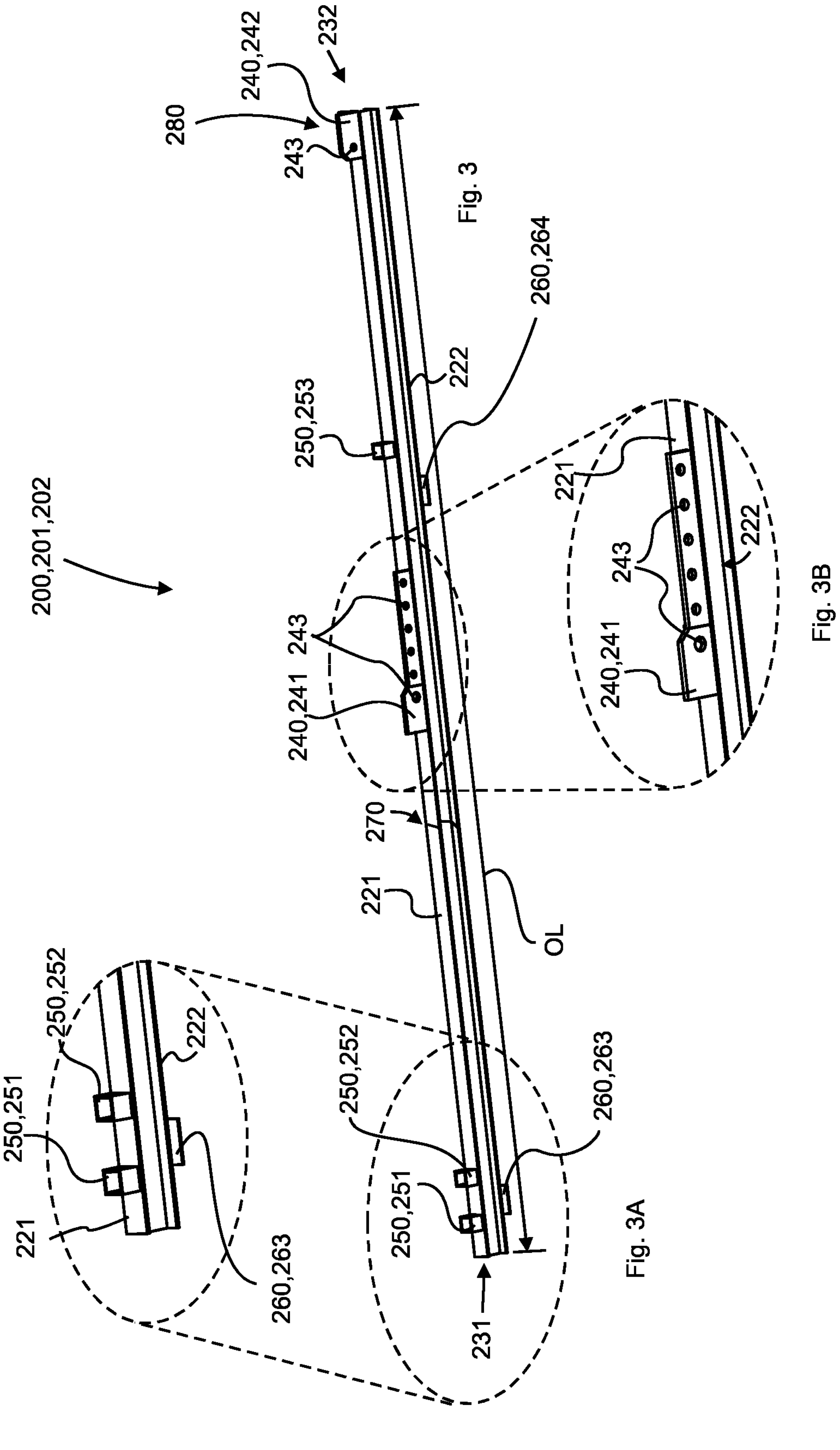
FIG. 3 is a perspective view of an exemplary embodiment of an outrigger beam of the building container outrigger according to select embodiments of the instant disclosure.
FIG. 3A is an exploded view of a section of the outrigger beam of the building container outrigger according to select embodiments of the instant disclosure in FIG. 3.
FIG. 3B is an exploded view of a section of the outrigger beam of the building container outrigger according to select embodiments of the instant disclosure in FIG. 3.
Figures 4, 4A:
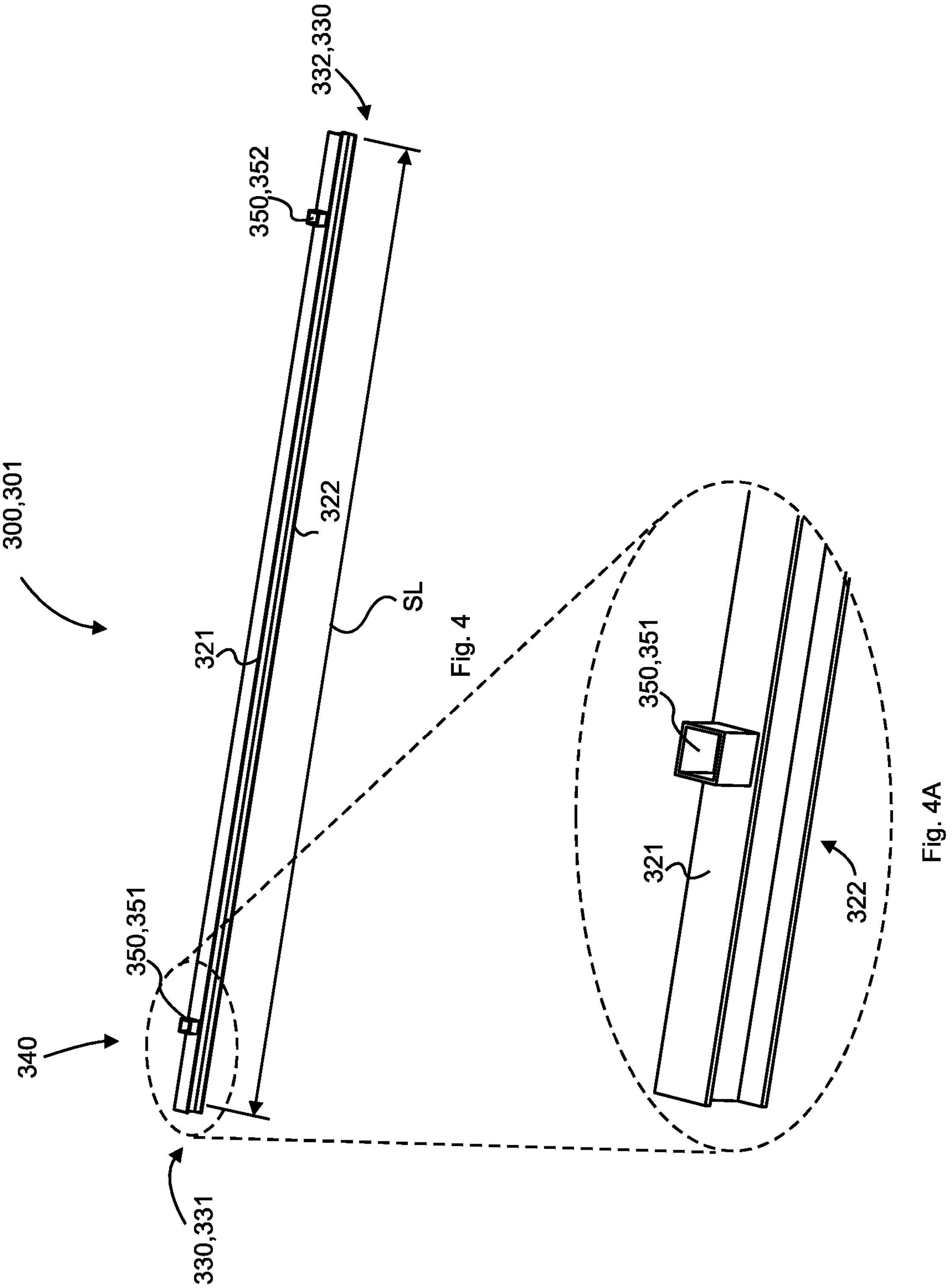
FIG. 4 is a perspective view of an exemplary embodiment of a support beam of the building container outrigger according to select embodiments of the instant disclosure.
FIG. 4A is an exploded view of a section of a support beam of the building container outrigger according to select embodiments of the instant disclosure in FIG. 4.
Figure 4B:
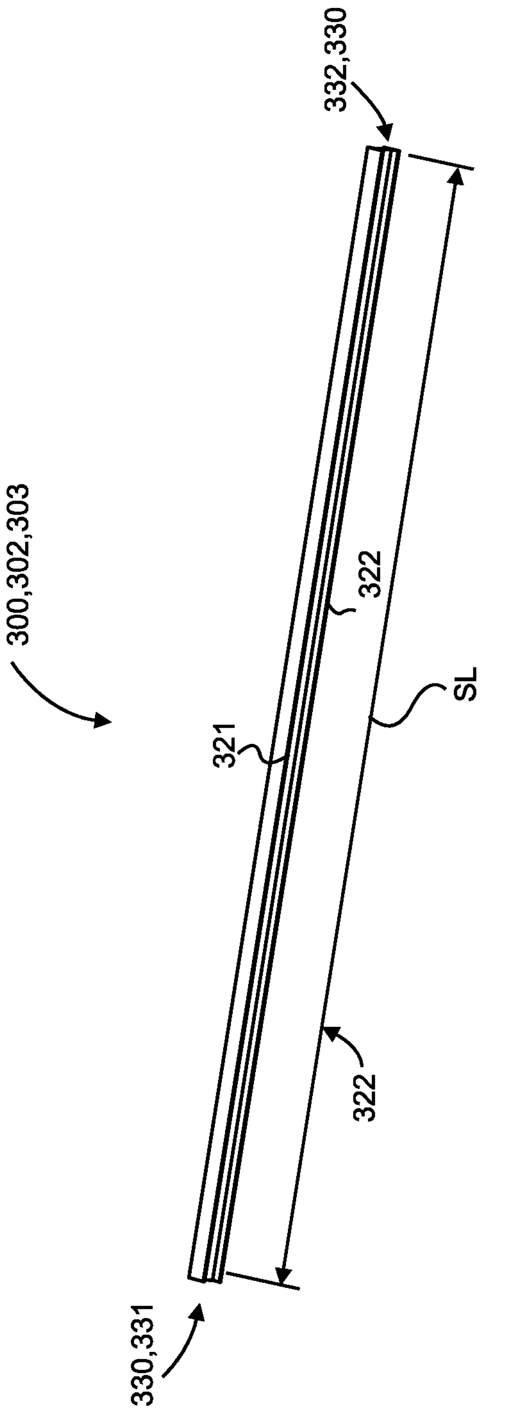
FIG. 4B is an exploded view of a section of an alternate support beam of the building container outrigger according to select embodiments of the instant disclosure in FIG.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in the figures specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples. It is recognized herein that the optimum dimensional relationships, to include variations in size, materials, shape, form, position, connection, function and manner of operation, assembly and use, are intended to be encompassed by the present disclosure.

Referring now to FIGS. 1, 2, 3, 3A, 3B, 4, and 4A, by way of example, and not limitation, there is illustrated an example embodiment of container outrigger 10 and its parts, according to this select embodiment. Container outrigger 10 is preferably configured having primary parts, such as a storage or meeting enclosure or space, such as container 100, a plurality of or more specifically a pair of extending lateral supports in one direction, such as outrigger beams 200, and a plurality of or more specifically three container supports in another direction, such as support beams 300.

Container 100 may have front edge 112 and floor 114, sidewalls 140, and ceiling 130. Container 100 may include a variety of configurations, such as, configured with a floor plan to accommodate or be used as an office, break, lunch, bathroom, storage, management discussions, meals, and the like. Moreover, container 100 may include an entrance 120 or exit including doors, windows, vents, hatch, roof accesses 120 therein ceiling 130, and the like. Furthermore, container 100 may be configured with a floor plan of an observation deck, sales space simulating an eventual office, residential, or balcony space with actual windows, doors, decking and furnishings to simulate a space with a view from building.

Container 100 may be configured with sidewalls 140, such as front sidewall 141, left sidewall 142, back sidewall 143, and right sidewall 144.

It is contemplated herein that container 100 may be dimensioned as approximately eight feet by twenty feet.

Support beams 300 may include first support beam 301, second support beam 302, and third support beam 303. Support beams 300 may include upper support side 321, lower support side 322, and beam support ends 330, such as first support end 331 and second support end 332. Each support beam 300 may be positioned lengthwise under floor 114 of container 100 and extend therefrom or beyond sidewalls 140 to support container 100 from below. Each support beam 300 may be positioned in spaced apart and parallel alignment thereunder container 100 and removeably affix or affix upper support side 320 of support beams 300 to floor 114 of container 100.

Support beams 300 may be further configured with a plurality, at least one, and more specifically a pair of hollow shore receptacles 350, such as first support shore cup 351 and second support shore cup 352. First support shore cup 351 may be affixed to upper support side 321 and positioned proximate first support end 331. Second support shore cup 252 may be affixed to upper support side 321 and positioned proximate second support end 332.

It is contemplated herein that support beams 300 may be dimensioned as approximately twenty-five feet in length SL.

Outrigger beams 200 may include first outrigger beam 201 and a second outrigger beam 202. Outrigger beams 200 may include upper outrigger side 221 and lower outrigger side 222. Outrigger beams 200 may include outrigger ends 230, such as first outrigger end 231 (extended end) and second outrigger end 232. Each outrigger beams 200 may be positioned lengthwise with second outrigger end 232 positioned above support beams 300. Each support beam 300 may be positioned in spaced apart and parallel alignment and removeably affix or affix lower outrigger side 222 of outrigger beams 200 to upper support side 321 of support beams 300 proximate beam support ends 330 with extended section 340, which extend therefrom or beyond sidewalls 140.

Outrigger beams 200 may be configured with a plurality and more specifically a pair of shackle connectors, such as first outrigger lug plate 241 and second outrigger lug plate 242. First outrigger lug plate 241 may be affixed to upper outrigger side 221 and positioned between first outrigger end 231 and second outrigger end 232. Second outrigger lug plate 242 may be affixed to upper outrigger side 221 and positioned proximate second outrigger end 232.

It is contemplated herein that first outrigger lug plate 241 and second outrigger lug plate 242 may include one or more spaced apart lug plate aperture 243 configured to receive a connect bolt, shackle, or pin to lift outrigger beams 200.

Outrigger beams 200 may be further configured with a plurality of, at least one, and more specifically a pair of hollow shore receptacles 250, such as first outrigger shore cup 251 and second outrigger shore cup 252. First outrigger shore cup 251 may be affixed to upper outrigger side 221 and positioned proximate first outrigger end 231. Second outrigger shore cup 252, a backup shore cup, may be affixed to upper outrigger side 221 and positioned proximate first outrigger shore cup 251. It is contemplated herein that hollow shore receptacles 250 may be configured to receive anchor mechanism, such as shores SH.

Outrigger beams 200 may be further configured with a plurality of, at least one, and more specifically a pair of bearing plates 260, such as first outrigger bearing plate 261,264 and second outrigger bearing plate 262, 263. First outrigger bearing plate 261,264 may be affixed to lower outrigger side 222 and positioned proximate first outrigger end 231. Second outrigger bearing plate 262,263 may be affixed lower outrigger side 222 and positioned proximate between first outrigger end 231 and second outrigger end 232. It is contemplated herein that outrigger bearing plates 260 enable or assist lower outrigger side 222 of outrigger beams 200 in sliding across floor F of slab S1, see FIGS. 10 and 11.

It is contemplated herein that outrigger beams 200 may be dimensioned as approximately twenty-nine feet in length OL. It is further contemplated herein that a connection device between outrigger beams 200 and support beams 300 to enable shipping and quick assembly at worksite between outrigger beams 200 and support beams 300, such as slotted connectors, telescoping or slide adjust in length 270, first outrigger end 231 of outrigger beams 200, second outrigger end 232 of 300 outrigger beams 200 configured to hinge or pivot 280 about beam support ends 330 of support beams 300 or other quick connect or quick assembly configuration to be capable of being performed at the worksite.

Furthermore, support beams 300 may be configured in a spaced apart and parallel alignment and may be releasably affixed or affixed to outrigger beams 200 proximate second outrigger end 232 proximate beam support ends 330 and extended section 340 of support beams 300, which extend therefrom or beyond sidewalls 140. Moreover, upper support side 321 of each support beams 300, such as first support beam 301, second support beam 392, and third support beam 303 may be releasably affixed or affixed to outrigger beams 200 in spaced apart and parallel alignment, such as first outrigger beam 201 and a second outrigger beam 202, and more specifically to lower outrigger side 222 of outrigger beams 200.

It is recognized herein that support beams 300 may be affixed or removeably affixed to outrigger beams 200, such as affixed by welding or riveted or the like, removeably affixed by bolted (holes, apertures, bolt, washer, lock washer, and nuts), or quick release (slots, channels, latches, quick connectors) or the like to enable disassembly of container 100 and support beams 300 from outrigger beams 200 to simplify dimensions for shipping container 100 and support beams 300 separate from or in conjunction with outrigger beams 200. It is contemplated that other attachment or mechanical connections are contemplated herein.

It is contemplated herein that support beams 300 and outrigger beams 200 may be configured as I-beam, channel beam, angle iron, square tube, other tube, or like elongated supports structures constructed to support and connect container 100 to building B.

Figures 5, 6:
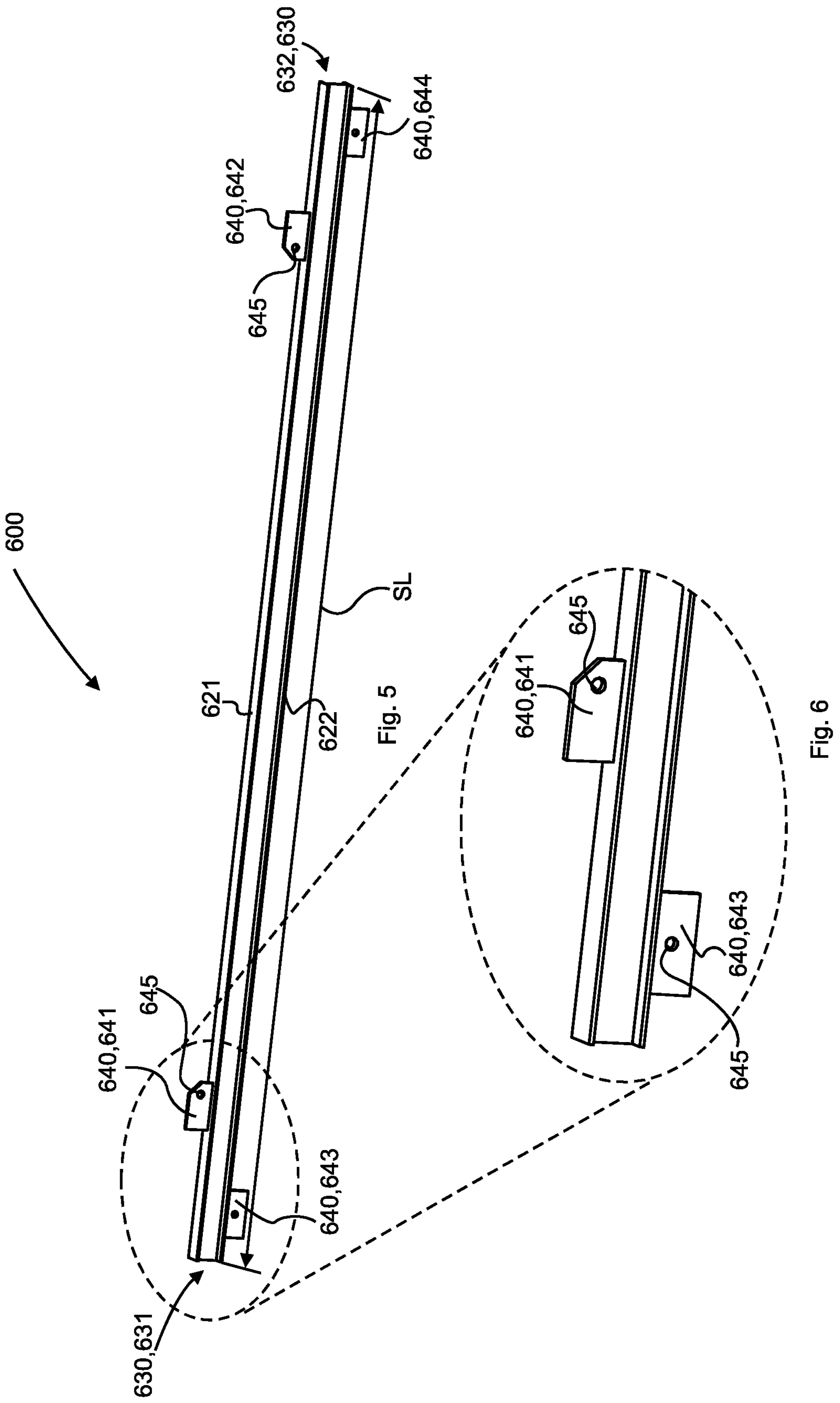
FIG. 5 is a perspective view of a spreader beam of the building container outrigger according to select embodiments of the instant disclosure.
FIG. 6 is an exploded view of a section of spreader beam of the building container outrigger according to select embodiments of the instant disclosure in FIG. 5.

Referring now to FIGS. 5 and 6, by way of example, and not limitation, there is illustrated an example embodiment of spreader beam 600, according to this select embodiment. Spreader beam 600 may include upper spreader side 621 and lower spreader side 622. Spreader beam 600 may include spreader ends 630, such as first spreader end 631 and second spreader end 632. Spreader beam 600 may be positioned lengthwise above container 100 with first spreader end 631 positioned above left sidewall 142 and second spreader end 632 positioned above right sidewall 144.

Spreader beam 600 may be configured with a plurality and more specifically a pair of shackle connectors, such as first spreader pick plate 641 and second spreader pick plate 642. First spreader pick plate 641 may be affixed to upper spreader side 621 proximate first spreader end 631. Second spreader pick plate 642 may be affixed to upper spreader side 621 and positioned proximate second spreader end 632. It is contemplated herein the a crane CN or other lift device may be releasably connected to first spreader pick plate 641 and second spreader pick plate 642, via hole or aperture 645.

Spreader beam 600 may be configured with a plurality and more specifically a pair of shackle connectors, such as first or third spreader lug plate 643 and second or fourth spreader lug plate 644. Third spreader lug plate 643 may be affixed to lower spreader side 622 proximate first spreader end 631. Second spreader lug plate 644 may be affixed to lower spreader side 622 and positioned proximate second spreader end 632. It is contemplated herein that the a crane CN or other lift device may be releasably connected to first spreader pick plate 641 and second spreader pick plate 642, via hole or aperture 645.

It is contemplated herein that third spreader lug plate 643 and fourth spreader lug plate 644 of spreader beam 600 may be connected, such as chain, cable and shackle or the like to first outrigger lug plate 241 and second outrigger lug plate 242 of outrigger beams 200 to enable spreader beam 600 via a crane CN or the like to lift or reposition outrigger beams 200, support beams 300, and container 100 simultaneously.

It is contemplated herein that first spreader pick plate 641 and second spreader pick plate 642 and as third spreader lug plate 643 and fourth spreader lug plate 644 may include plate aperture 645 configured to receive a connect bolt, shackle, or pin to lift outrigger beams 200.

Figure 7:
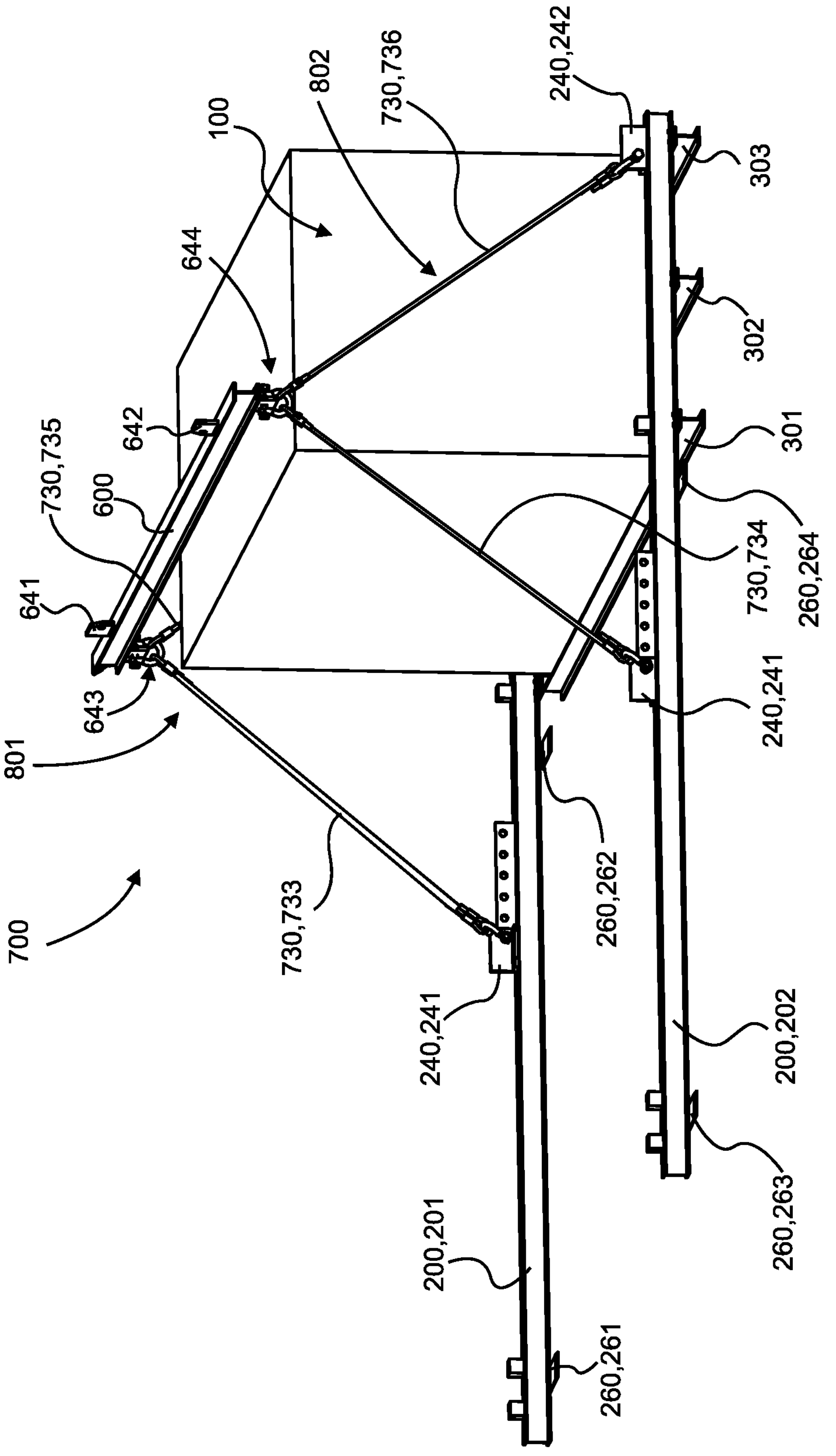
FIG. 7 is a perspective view of an exemplary embodiment of a spreader beam cabled to the outrigger beam of the building container outrigger according to select embodiments of the instant disclosure.
Figure 8:
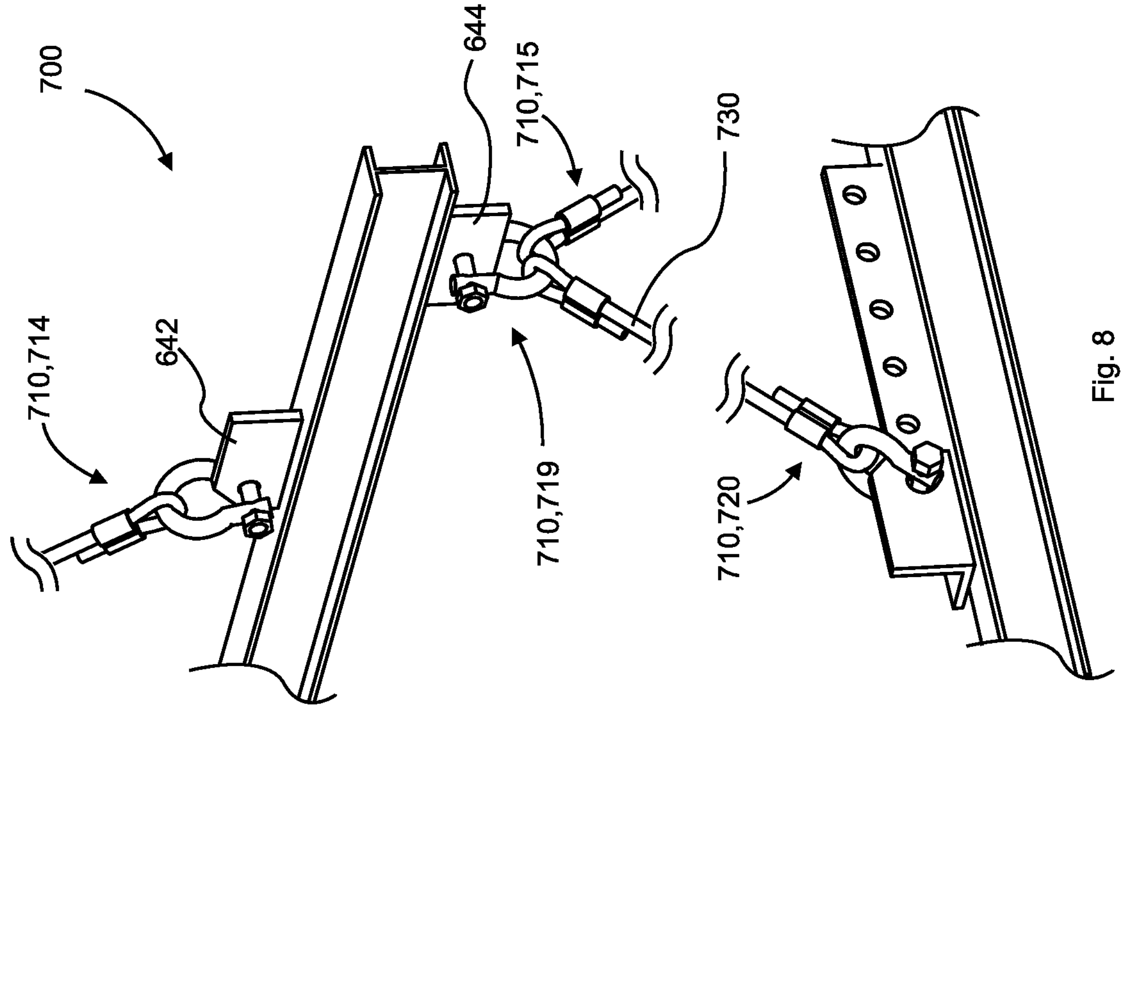
FIG. 8 is an exploded perspective view of an exemplary embodiment of a spreader beam cabled to the outrigger beam of the building container outrigger according to select embodiments of the instant disclosure.
Figure 9:
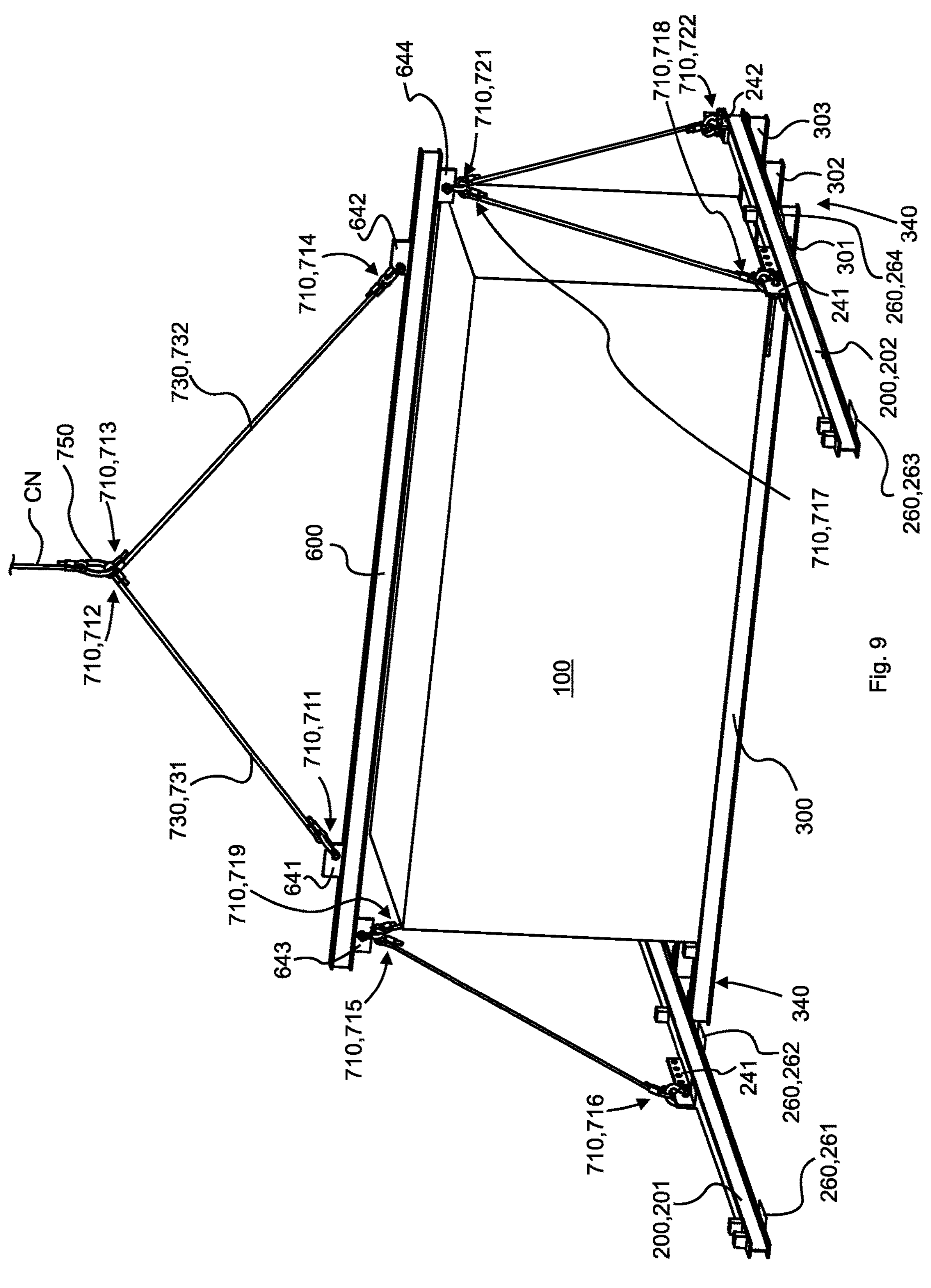
FIG. 9 is a perspective view of an exemplary embodiment of a crane cabled to a spreader beam cabled to the outrigger beams of the building container outrigger according to select embodiments of the instant disclosure.

Referring now to FIGS. 7, 8 and 9, by way of example, and not limitation, there is illustrated an example embodiment of lift mechanism 700 according to this select embodiment. For example, lift mechanism 700 may include plurality of lift bridles with thimble eyes, cables, ropes, chains, rope, wire rope or the like with loop ends, such as wire lift rope 730 and removable shackle connectors, clasps, pins, clamps, or the like, such as lift connectors 710.

Wire lift rope 730 may include two leg lift bridle configured as first wire lift rope 731 having a first end removeably connected to first spreader pick plate 641 of spreader beam 600 via first lift connector 711 and other end of first wire lift rope 731 removeably connected to lift ring 750 via second lift connector 712. Wire lift rope 730 may include second wire lift rope 732 having a first end removeably connected to second spreader pick plate 642 of spreader beam 600 via fourth lift connector 714 and other end of second wire lift rope 732 removeably connected to lift ring 750 via third lift connector 713 (releasably connected).

Moreover, wire lift rope 730 may include a pair of two leg lift bridles, the first of the pair of two leg lift bridle 801 configured as third wire lift rope 733 having a first end removeably connected to third spreader lug plate 643 of spreader beam 600 via fifth lift connector 715 and other end of third wire lift rope 733 removeably connected to second outrigger lug plate 241 of outrigger beam 201 via sixth lift connector 716. Wire lift rope 730 may include fifth wire lift rope 735 having a first end removeably connected to third spreader lug plate 643 of spreader beam 600 via ninth lift connector 719 and other end of fifth wire lift rope 735 removeably connected to fourth outrigger lug plate 244 of outrigger beam 201 via eighth lift connector 720 (releasably shackled).

Moreover, wire lift rope 730 may include the second of the pair of two leg lift bridle 802 configured as fourth wire lift rope 734 having a first end removeably connected to fourth spreader lug plate 644 of spreader beam 600 via seventh lift connector 717 and other end of fourth wire lift rope 734 removeably connected to second outrigger lug plate 242 of outrigger beam 202 via eighth lift connector 718. Wire lift rope 730 may include sixth wire lift rope 736 having a first end removeably connected to fourth spreader lug plate 644 of spreader beam 600 via eleventh lift connector 721 and other end of sixth wire lift rope 736 removeably connected to third outrigger lug plate 243 of outrigger beam 202 via tenth lift connector 722 (releasably shackled).

Figure 10:
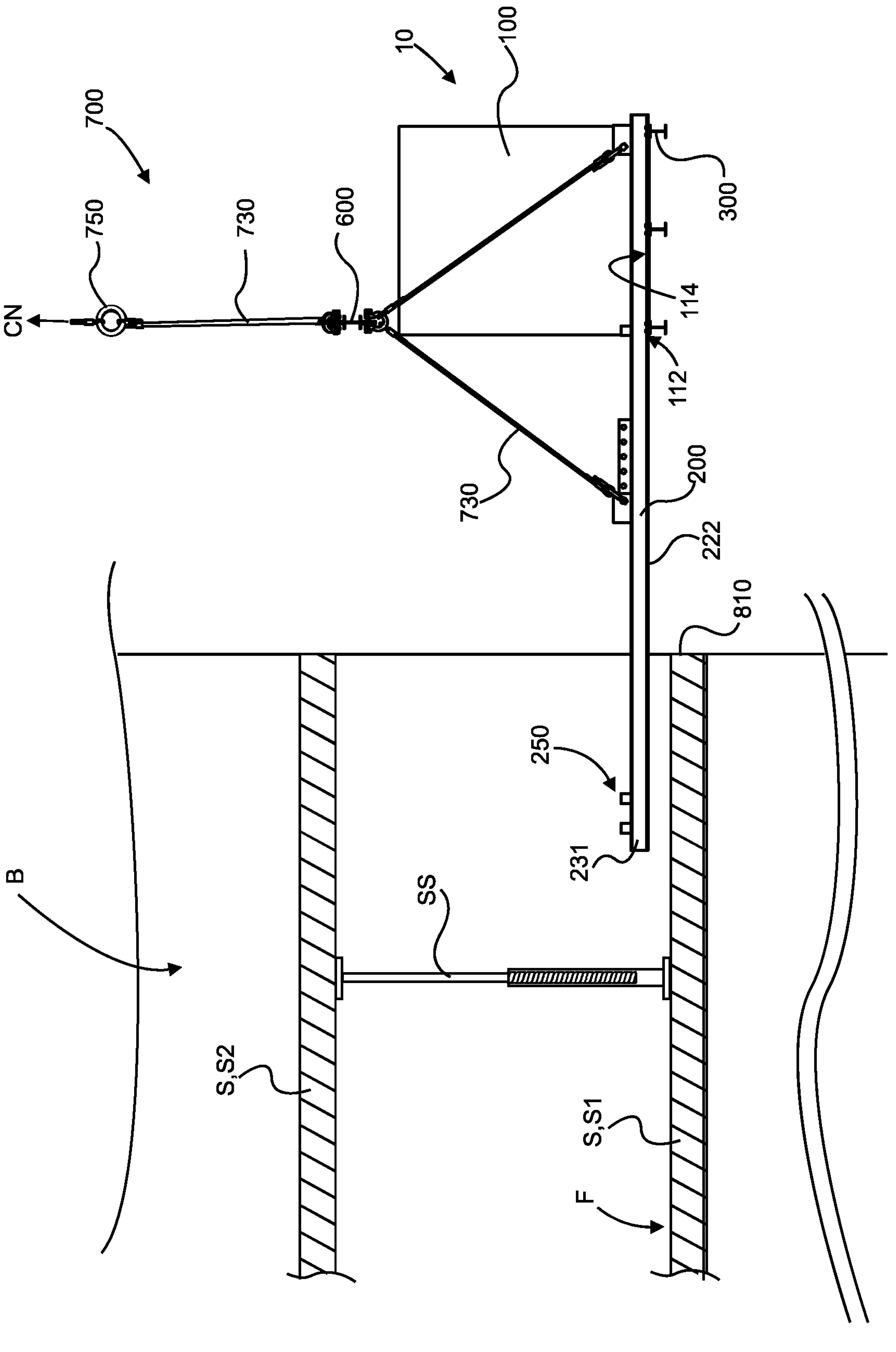
FIG. 10 is a side view of an exemplary embodiment of a crane cabled to a spreader beam cabled to the outrigger beams of the building container outrigger according to select embodiments of the instant disclosure, shown inserting outrigger beams between slabs.
Figure 11:
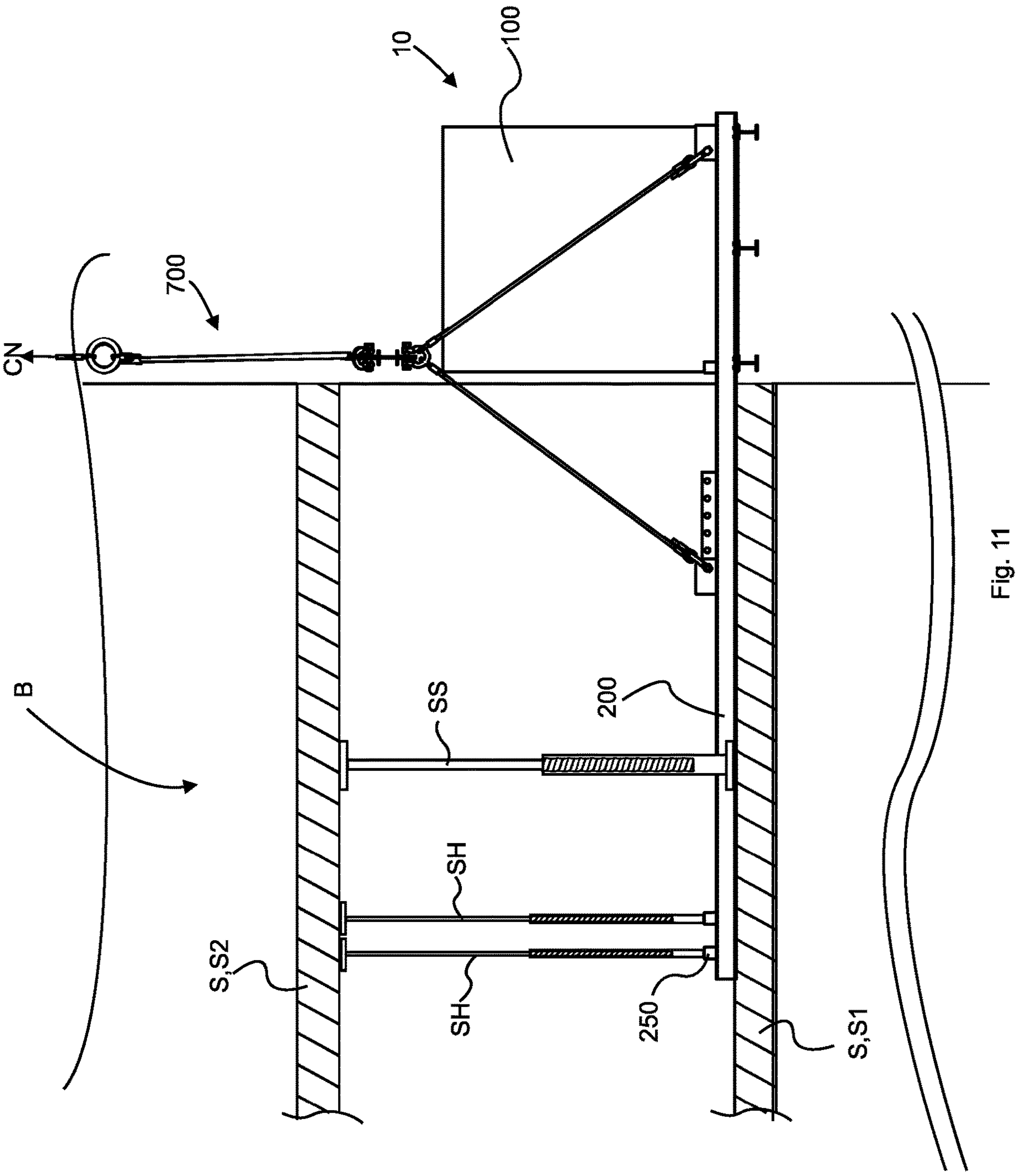
FIG. 11 is a side view of an exemplary embodiment of a crane cabled to a spreader beam cabled to the outrigger beams of the building container outrigger according to select embodiments of the instant disclosure, shown anchoring outrigger beams between slabs.
Figure 12:
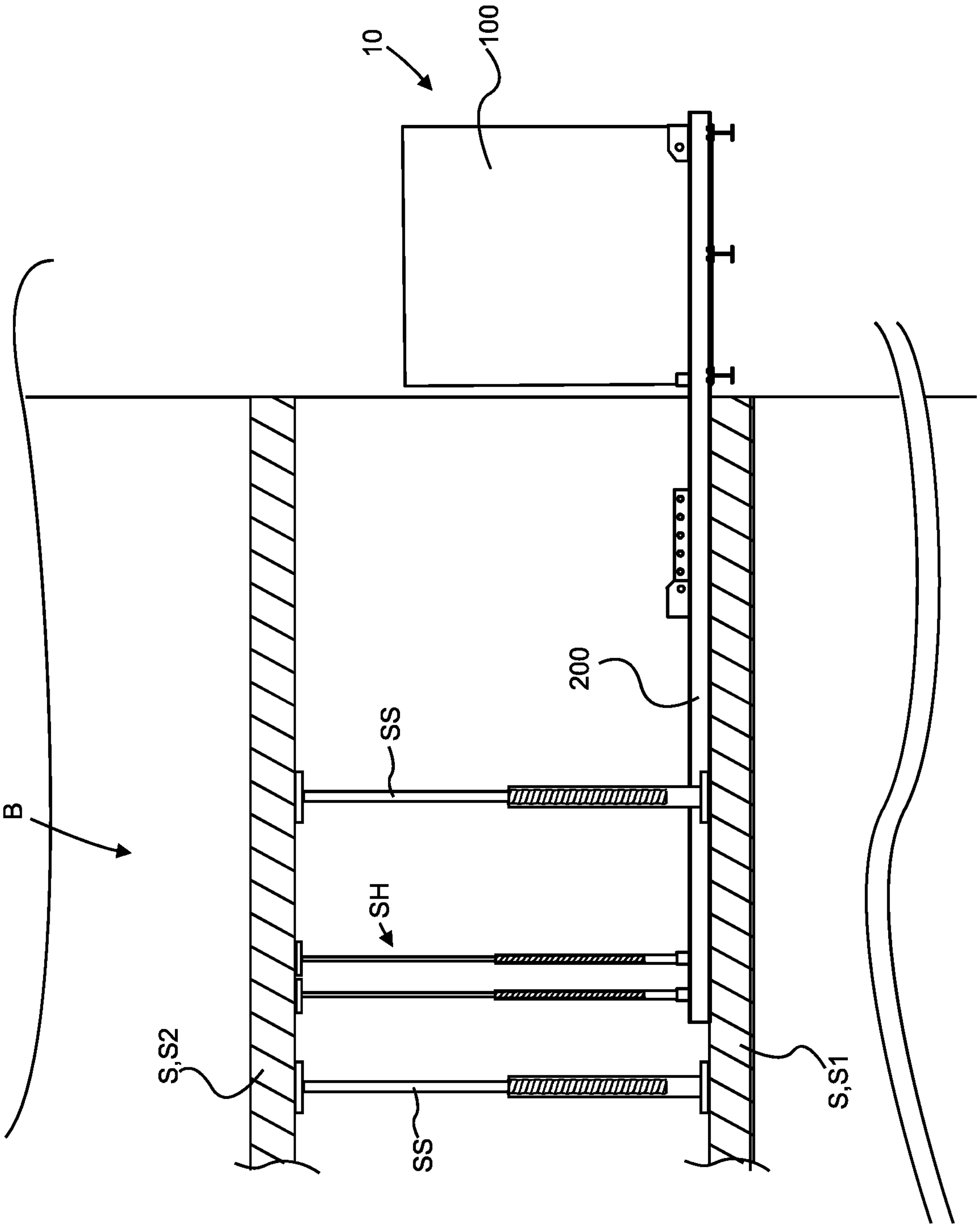
FIG. 12 is a side view of an exemplary embodiment of the building container outrigger according to select embodiments of the instant disclosure, shown anchored between slabs.

Referring now to FIGS. 10, 11 and 12, by way of example, and not limitation, there is illustrated an example embodiment of lift mechanism 700 lifting and positioning container outrigger 10 according to this select embodiment. For example, crane CN may be connected to lift ring 750 to lift spreader beam 600, outrigger beams 200, support beams 300, and container 100 as a unit container outrigger 10. Moreover, container outrigger 10 may be raised adjacent floors of a building under construction with slabs S poured with remaining slab supports SS. Crane CN may be utilized to position first outrigger end 231 of outrigger beams 200 between slabs S, such as first slab's floor, floor slab S1 and second slab's underside or slab ceiling S2 with lower outrigger side 222 and floor bearings 260 in contact with floor F of slab S1. Outrigger beams 200 and container outrigger 10 may be anchored in place having front edge 112 and floor 114 of container 100 in contact with front slab edge 810 and floor F slab S1 with no threshold deviation in height therebetween, via plurality or one or more shores SH inserted in shore receptacles 250 and in contact with ceiling of the above slab. Container outrigger 10 may be anchored to floor F of slab S1 an cantilevered thereto any slab S or floor of building B. Container outrigger 10 may be utilized to efficiently move materials and tools from floor to floor as construction phases move vertically with the build and move break rooms, bathrooms, offices, meals, and the like as container 100 from floor to floor as construction phases move vertically with the building of building B.

Figure 13:
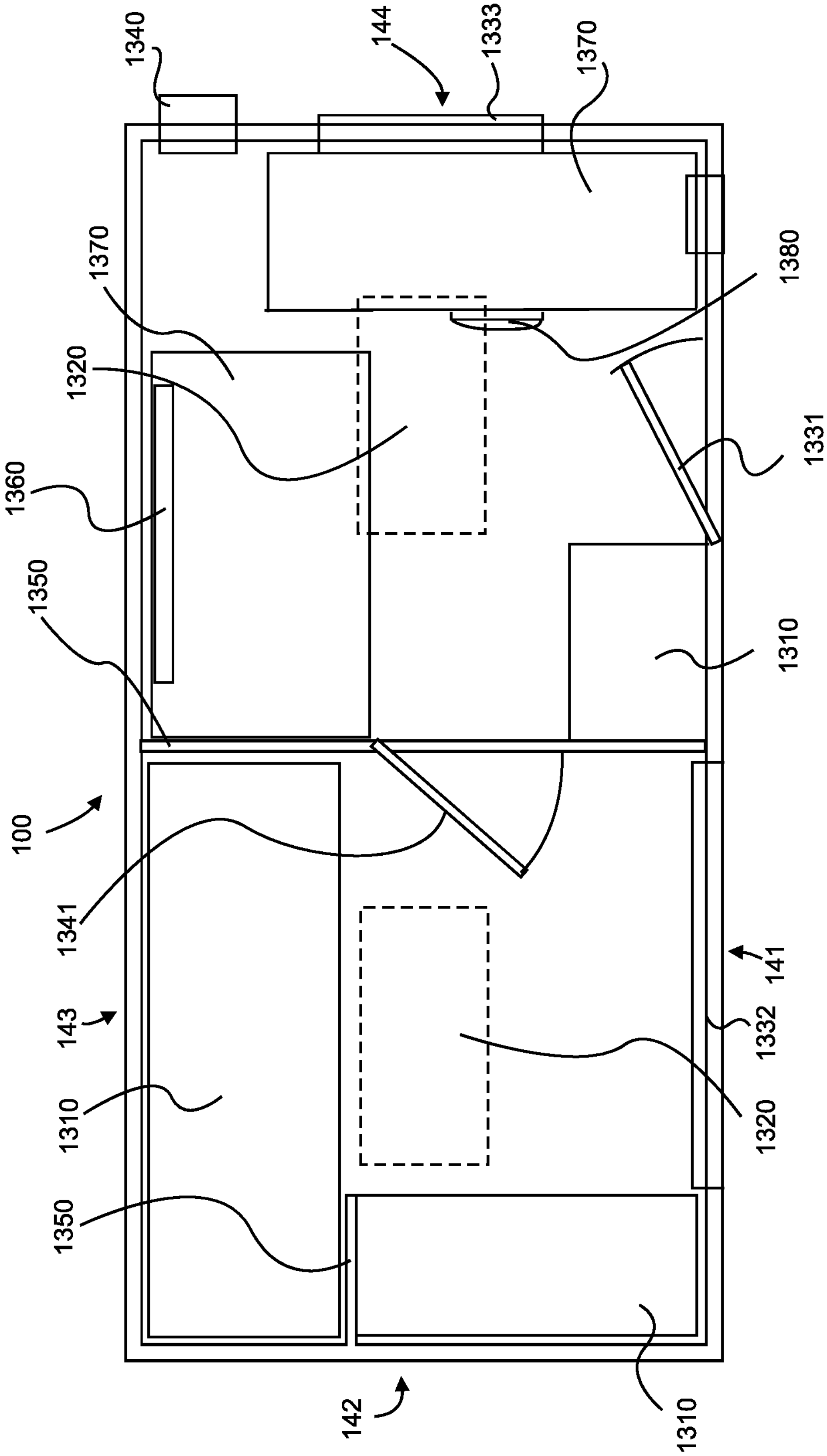
FIG. 13 is a plan view of an exemplary embodiment of the container floor plan of the building container outrigger according to select embodiments of the instant disclosure.

Referring now to FIG. 13, by way of example, and not limitation, there is illustrated an example embodiment of container 100 according to this select embodiment. Container 100 may be configured with sidewalls 140, such as front sidewall 141, left sidewall 142, back sidewall 143, and right sidewall 144. In this embodiment, container 100 may be configured with roll-up door 1332, exit door 1331, window 1333, and other like points of entry. Internally in this embodiment, container 100 may be configured having interior separation walls 1350 and interior lockable doors 1341 to partition container 100 and lighting 1320. Container may be furnished with shelves 1310, drafting tables or other work desks or stations 1370 with seating, such as chair 1380, computing devices, such as monitors, and other like furnishings.

Container 100 may include a variety configurations such as configured with a floor plan to accommodate or be used as an office, break, lunch, bathroom, outfitted with furnishings, storage, tool and material storage, management discussions, meals, and the like for its intended use or task. It is further contemplated herein that other and all possible construction materials whether exterior or interior are contemplated herein for container 100.

It is further contemplated herein that container 100 may be outfitted or equipped with supplies, tools, and materials for current floor use or tasks of a high-rise building under construction or retrofit task, such as rough in of walls, electrical, plumbing, insulation, HVAC, drywall, windows, trim, flooring, paint, furnishings, which may be ordered, fulfilled and shipped as a service to site furnished for with tools and materials needed to complete such task.

With respect to the description herein, it is to be realized that the optimum dimensional relationships, to include variations in size, materials, shape, form, position, connection, function and manner of operation, assembly and use, are intended to be encompassed by the present disclosure.

It is contemplated herein that container outrigger 10 components may be constructed of steel, stainless steel, aluminum, or the like materials and of different dimensions. This and other materials herein may be constructed of metal, steel, alloy, or plastic or more specifically high density polyethylene or similar high tensile or strengthened materials, as these material offers a variety of forms and shapes and provide strength with reduced weight; however, other suitable materials or the like, can be utilized, provided such material has sufficient strength and/or durability as would meet the purpose described herein to enable container outrigger 10 to meet construction and building specifications and worker safety.

It is understood herein that various changes in the material used, shape, size, arrangement of parts, and parts are connected with bolts, pins, screws or similar fasteners or other rotating devices without departing from the spirit of the scope of the claims herein.

It is further understood herein that the parts and elements of this disclosure may be located or position elsewhere based on one of ordinary skill in the art without deviating from the present disclosure.

Figure 14:
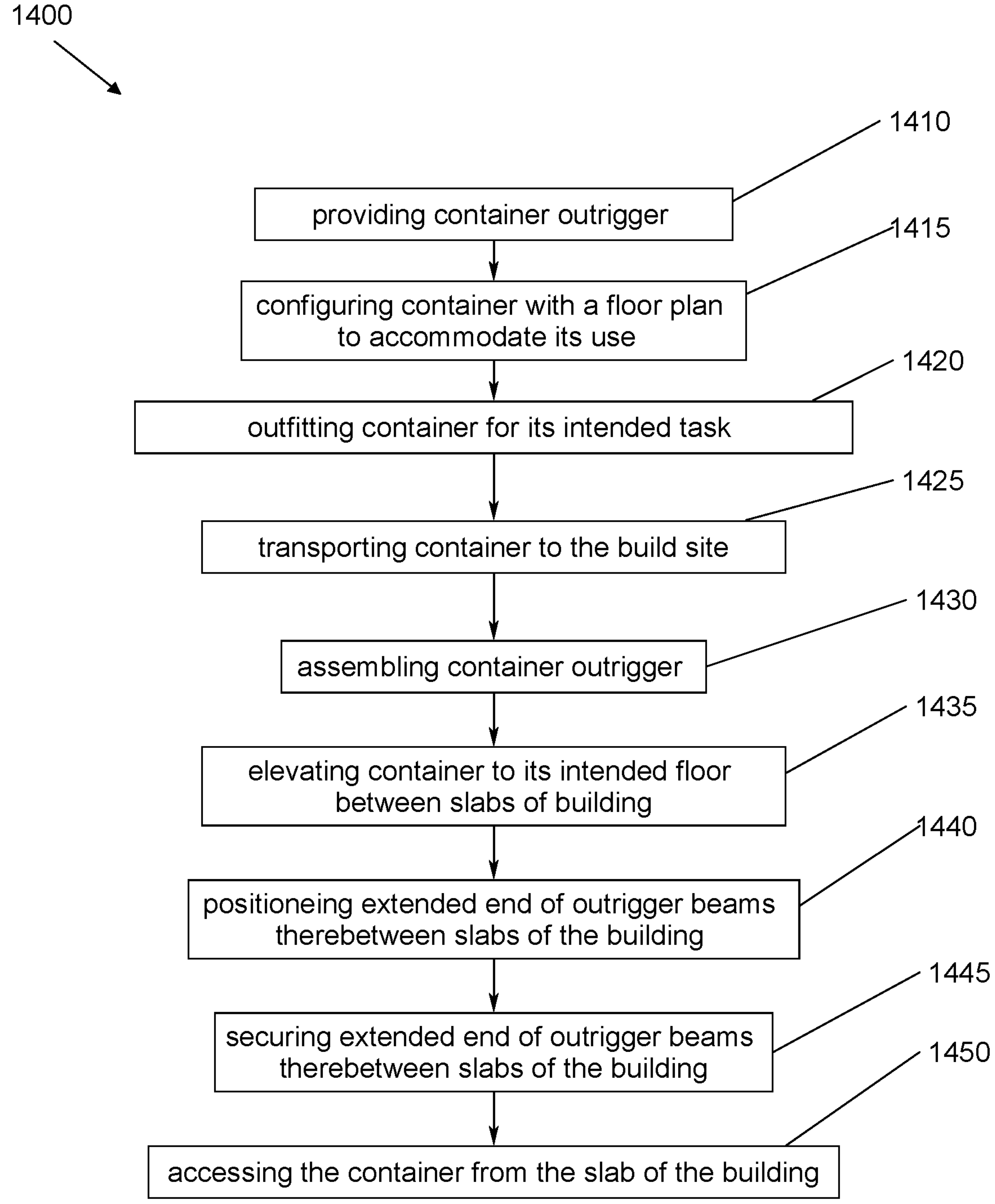
FIG. 14 is a flow chart of a process or method of equipping floor or slabs, such as concrete slabs of a high-rise building with container outrigger according to select embodiments of the instant disclosure.

Referring now to FIG. 14, there is illustrated a flow diagram 1400 of a method of equipping floor slab S, such as concrete slabs of a high-rise building B with container 100 equipped with tools and materials for current floor tasks or construction task of a high-rise building B under construction or retrofit task, such as rough in of walls, electrical, plumbing, insulation, HVAC, drywall, windows, trim, flooring, paint, furnishings, which may be ordered, fulfilled and shipped as a service to site furnished for with tools and materials needed to complete such task or configured with a floor plan to accommodate or be used as an office, break, lunch, bathroom, storage, tool and material storage, management discussions, meals, and the like.

In block or step 1410, providing container outrigger 10 having container 100, outrigger beams 200, and support beams 300, as described above in FIGS. 1-13. In block or step 1415, configuring container 100 with a floor plan to accommodate its designated use. In block or step 1420, outfitting container 100 for its intended task, with tools, materials, or furnishings, or interior configuration, or configured as office, break, lunch, bathroom, storage room, tool and material storage, management discussions, meals, and the like. In block or step 1425, transporting container 100 to the build site (building B). In block or step 1430, assembling container outrigger 10.

In block or step 1435, elevating or lifting container 100 via a crane CN to its intended floor between slabs S of building B. In block or step 1440, positioning first outrigger end 231 an extended end of outrigger beams 200 therebetween slabs S of the building B. In block or step 1440, securing, anchoring, or shoring an extended end of outrigger beams 200 therebetween slabs S of the building B. In block or step 1445, accessing cantilevered container 100 in an elevated position therebetween slabs S of the building B to access tools and materials for current floor tasks of a high-rise building under construction or retrofit task, such as rough in of walls, electrical, plumbing, insulation, HVAC, drywall, windows, trim, flooring, paint, furnishings, which may be ordered, fulfilled and shipped as a service to building B site furnished for with tools and materials needed to complete such task or configured with a floor plan to accommodate or be used as an office, break, lunch, bathroom, storage, tool and material storage, management discussions, meals, and the like to save time, money and enable materials and personnel to complete work tasks on a designated floor of a high-rise building B under construction or retrofit without having to ride an elevator up and down the building for tools, materials, breaks, bathroom, management discussions, meals, and the like.

With respect to the above description then, it is to be realized that the optimum dimensional relationships, to include variations in size, materials, shape, form, position, movement mechanisms, function and manner of operation, assembly and use, are intended to be encompassed by the present disclosure.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein but is limited only by the following claims.

The invention claimed is:

1. A method of equipping a high-rise building having a first slab having a front slab edge and a slab floor and a second slab having a slab ceiling, a plurality of shores, and a crane for a construction task, said method comprising the steps of:

providing a container having sides, a front edge, and a floor, a pair of outrigger beams having an upper outrigger side and a lower outrigger side, each said outrigger beam positioned proximate one of said sides of said container, a plurality of support beams having ends, an upper support side, and lower support side, each said support beam positioned under said floor of said container, said upper support side of said ends of said support beam removeably affixed to said lower outrigger side of each said outrigger beam;

selecting furnishings to complete the construction task;

loading said container with said select furnishings;

transporting said container proximate the high-rise building;

lifting said container to a position between slabs of the high-rise building;

positioning an extended end of said pair of outrigger beams therebetween the first slab and second slab of the high-rise building;

securing said extended end of said pair of outrigger beams therebetween the first slab and second slab of the high-rise building; and accessing said container from the first slab of the high-rise building.

2. The method of claim 1, further comprising the step of outfitting said container with an interior configuration of an office.

3. The method of claim 1, further comprising the step of outfitting said container with an interior configuration of a break room.

4. The method of claim 1, further comprising the step of outfitting said container with an interior configuration of a lunch room.

5. The method of claim 1, further comprising the step of outfitting said container with an interior configuration of a shower room.

6. The method of claim 1, further comprising the step of outfitting said container with an interior configuration of a bathroom.

7. The method of claim 1, further comprising the step of outfitting said container with an interior configuration of a storage room.

8. The method of claim 1, further comprising the step of positioning said front edge of said container in contact with said front slab edge of said first slab.

9. The method of claim 1, further comprising the step of outfitting said container with furnishings selected from group of electrical, plumbing, insulation, HVAC, drywall, windows, trim, flooring, paint, and combinations thereof.

* * * * *